United States Patent [19]

Maeda

[11] Patent Number: 4,548,416
[45] Date of Patent: Oct. 22, 1985

[54] OIL-RING INCLUDING TWO RAIL RINGS AND AN EXPANDER-SPACER RING WHICH BITES INTO THE RAIL RING

[75] Inventor: Yorishige Maeda, Toyota, Japan

[73] Assignee: Toyota Jidosha Kabushiki Kaisha, Toyota, Japan

[21] Appl. No.: 598,431

[22] Filed: Apr. 9, 1984

[30] Foreign Application Priority Data

Jul. 21, 1983 [JP] Japan .................. 58-131858

[51] Int. Cl.⁴ .......................... F16J 9/20; F16J 9/22
[52] U.S. Cl. ..................... 277/140; 277/216; 267/1.5
[58] Field of Search ............... 277/139, 140, 141, 148, 277/216; 267/1.5

[56] References Cited

U.S. PATENT DOCUMENTS

| | | | |
|---|---|---|---|
| 2,635,022 | 4/1953 | Shirk | 277/140 |
| 2,827,349 | 3/1958 | Burns | 277/140 |
| 2,967,746 | 1/1961 | Braendel | 277/139 |
| 3,228,704 | 1/1966 | Hamm | 267/1.5 X |
| 3,683,477 | 8/1972 | Sugahara | 277/140 X |
| 3,752,490 | 8/1973 | Geffroy | 277/140 |
| 4,139,205 | 2/1979 | Duck et al. | 277/140 |
| 4,194,747 | 3/1980 | Nisper | 267/1.5 X |

FOREIGN PATENT DOCUMENTS

| | | | |
|---|---|---|---|
| 2709176 | 9/1978 | Fed. Rep. of Germany | 277/140 |
| 2720297 | 10/1978 | Fed. Rep. of Germany | 277/140 |
| 3021495 | 12/1981 | Fed. Rep. of Germany | 277/140 |
| 726986 | 3/1955 | United Kingdom | 277/140 |
| 768920 | 2/1957 | United Kingdom | 277/140 |
| 438798 | 1/1975 | U.S.S.R. | 277/140 |

*Primary Examiner*—Robert S. Ward
*Attorney, Agent, or Firm*—Cushman, Darby & Cushman

[57] ABSTRACT

A composite oil-ring comprises a pair of rail rings and an expander-spacer ring. The expander-spacer ring is laterally extending U-shaped in cross section providing rail supporting legs and an inwardly open channel between the legs of the U. The expander-spacer ring is integrally formed with a plurality of axially extending rail engaging portions circumferentially spaced at the inner periphery of each of the legs, and has a plurality of slots extending radially cut from the inner peripheries of the legs. Also, the rail engaging portions may have circumferential central portions with the same curvature as that of the rail rings and circumferential end portions with a smaller curvature than that of the rail rings. Such structure reduces the abrasion of the composite oil-ring and prevents an independent movement of the rail rings.

7 Claims, 17 Drawing Figures

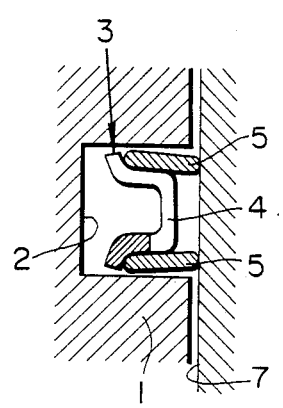
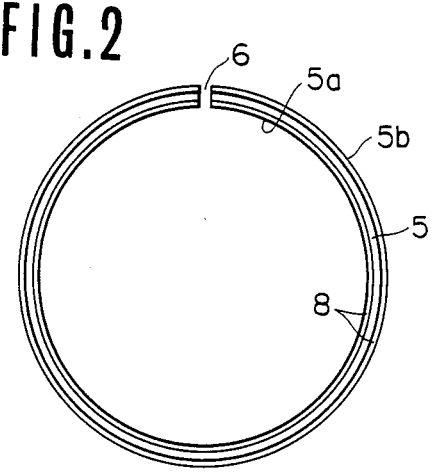
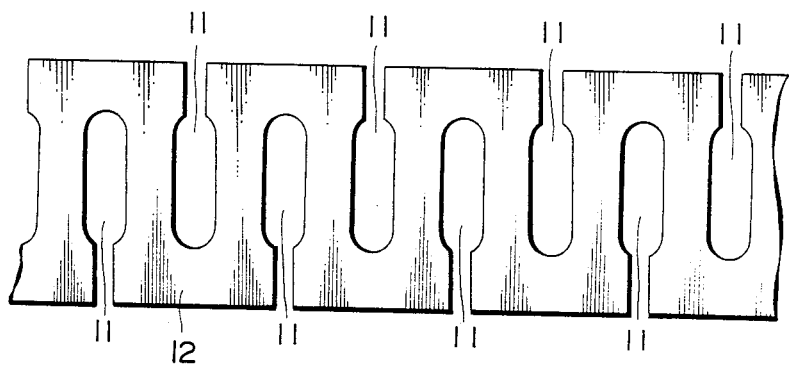
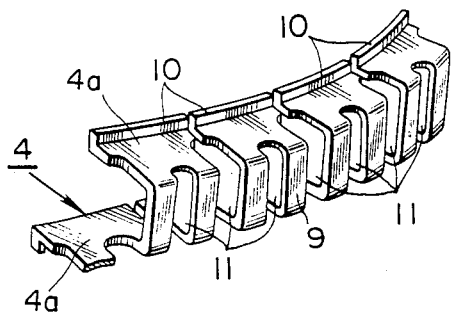

OIL-RING INCLUDING TWO RAIL RINGS AND AN EXPANDER-SPACER RING WHICH BITES INTO THE RAIL RING

BACKGROUND OF THE INVENTION

1. Field of the Invention

The present invention relates to a composite oil-ring composed of a pair of rail rings and an expander-spacer ring which is to be disposed in an oil-ring groove of a piston reciprocally positioned in a cylinder of an internal combustion engine.

2. Description of the prior Art

Conventionally, the composite oil-ring has been popularly used in a gasoline engine on account of its high bore-followability and high sealability in the oil-ring groove. When it is used in an engine burning a high-leaded gasoline, however, the composite oil-ring suffers heavy wear, and it has been common practice to cope with this problem by Cr-plating or tufftriding the especially vulnerable inner periphery of the rail ring and the expander-spacer ring.

Even the composite oil-ring thus treated will soon be worn out and lose its function of oil sealing, if it is used in a diesel engine. For this reason, the composite oil-ring to be used in a diesel engine has the inner periphery of its rail ring and its expander-spacer ring thickly Cr-plated (to a thickness 10-20 times greater than for a composite oil-ring used in an engine burning a high-leaded gasoline ) or thickly tufftrided (which requires use of a special material), but these measures will not help save the resources and energy and will even result in an increased cost.

SUMMARY OF THE INVENTION

A primary object of the present invention is to provide an anti-wear measure for a composite oil-ring which leads to no increased cost as suffered by the conventional measure. To be more specific, the present invention prevents the wear of the composite oil-ring by enlarging the contact area between the inner periphery of the rail ring and the expander-spacer ring, which is particularly liable to wear.

Another object of the present invention is to prevent the wear by inhibiting an independent movement of the rail ring as well as to prevent an increase of oil consumption.

In the composite oil-ring of the above-mentioned construction, since the cross section of the expander-spacer ring in the sliding direction of the composite oil-ring is a laterally extending U-shape, it is easy to make the circumferential length of the rail engaging portion greater than that of a conventional expander-spacer ring which has an irregular form in the circumferential direction of the composite oil-ring. Further, since slots are provided on both sides of the circumferential direction of the rail engaging portion, it is easy to increase the length of the rail engaging portion by making the rail engaging portion protrude into said slots. Therefore, the contact ratio of an expander-spacer ring and a rail ring, i,e., 100 times the division of the total sum of the rail engaging portion lengths by the length of the inner periphery of the rail ring, can be as large as 40% or more against 20-30% for a conventional composite oil-ring having an irregular form in the circumferential direction. The increase in said contact ratio will reduce the contact pressure between the expander-spacer ring and the rail ring, and in consequence will reduce the abrasion of the rail engaging portion against the inner periphery of the rail ring.

Desirably, the curvature of the circumferentially central portion of the rail engaging portion is designed equal to that of the inner periphery of the rail ring, thereby contributing to an increase in said contact ratio. Desirably, the curvature of the circumferentially end portions of the rail engaging portion is designed smaller than that of the inner periphery of the rail ring (including the case of the end portions being straight). Accordingly with the end portion tending to bite into the inner periphery of the rail ring, a relative rotation of the rail ring against the expander-spacer ring, i,e., an independent movement of the rail ring can be suppressed. Thus the abrasion due to the independent movement of the rail ring can be prevented, and at the same time the abutted portions of the paired rail rings provided at the top and the bottom of the expander-spacer ring can be prevented from coinciding with each other in the circumferential direction, whereby an increase of oil consumption due to the coincidence of the gaps of the abutted portions can be avoided.

The above-mentioned mitigation of the abrasion through the increase of the contact ratio and through the suppression of the independent movement of the rail ring will lead to the following relief in the conventional anti-wear countermeasures. Namely, special Cr-plating and tufftriding of the inner periphery of the rail ring and the expander-spacer ring in an engine burning a high-leaded gasoline may be abolished. In the case of the use in a diesel engine, the routine Cr-plating and tufftriding as practiced for a conventional gasoline engine will suffice.

If the contact ratio of the expander-spacer ring and the rail ring is set at more than 40% and at the same time Cr-plating of the rail ring is adopted, namely the inner and outer peripheries of the rail ring are Cr-plated with the thickness of the plating on the inner periphery over 0.1 mm, the composite oil-ring will be sufficiently durable even in the use for a diesel engine. The reason why the contact ratio is set at more than 40% is, as stated later, for securing a tension decrease rate of less than 25% in 300 hours of service. Thickness 0.1 mm of Cr-plating stipulated above is a value which guarantees at least 2000 hours of service (which is equivalent to 300,000 Km run of a car). By contrast, Cr-plating in the conventional oil-ring is $50\mu$-$80\mu$ thick at the most and the thickness 0.1 mm of Cr-plating has never been proposed.

BRIEF DESCRIPTION OF THE DRAWINGS

The above and other objects, features and advantages of the present invention will become apparent and be more readily appreciated from the following detailed description of the present preferred exemplary embodiments of the invention taken in conjunction with the accompanying drawings, in which:

FIG. 1 is a sectional view of an oil-ring according to a first embodiment of the present invention positioned in an oil-ring groove of a piston;

FIG. 2 is a plan view of a rail ring in the composite oil-ring of FIG. 1;

FIG. 3 is a developed view of an expander-spacer ring in the composite oil-ring of FIG. 1;

FIG. 4 is an oblique partial view of the expander-spacer ring in the composite oil-ring of FIG. 1;

DETAILED DESCRIPTION OF THE PREFERRED EMBODIMENTS

Figure 5:
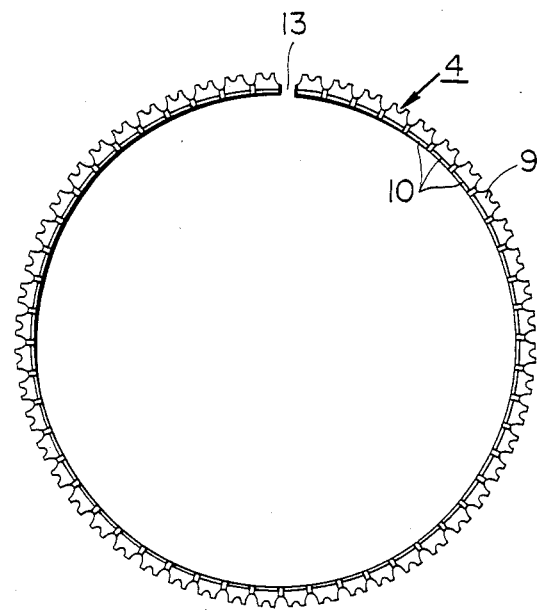
FIG. 5 is a reduced plan view of the expander-spacer ring in FIG. 4.

Some preferred embodiments of the present invention will be described hereunder referring to the attached drawings.

FIGS. 1 to 8 illustrate a composite oil-ring according to a first embodiment of the present invention. FIG. 1 shows engagement of a composite oil-ring with a piston reciprocally positioned in a cylinder of an internal combustion engine. As seen from the Figure, the oil-ring groove 2 formed in the piston 1 holds therein the expander-spacer ring 4 and a pair of rail rings 5, i.e., the components of the composite oil-ring 3. A pair of rail rings 5 engage the top and bottom of the expander-spacer ring 4.

Figure 6:
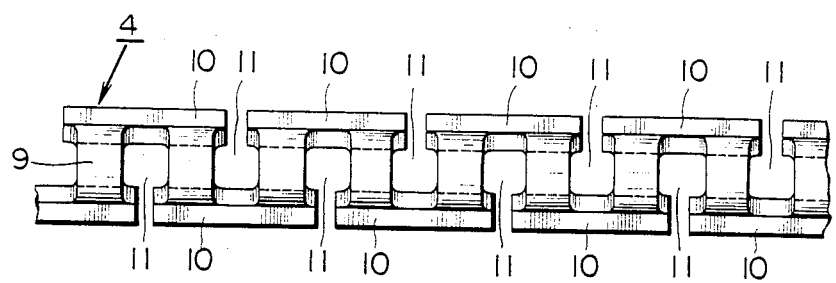
FIG. 6 is a front elevational view of the expander-spacer ring in FIG. 4.

As indicated in FIG. 2, the rail ring 5 consists of an elastic metallic annular strip abutted at the ends and has a gap 6 at the abutted portion. The outer periphery 5b of the rail ring 5 is in contact with the cylinder bore 7 through an oil film as shown in FIG. 6, thereby performing oil control. The outer periphery 5b and the inner periphery 5a of the rail ring 5 are usually plated with Cr-plating 8 or tufftrided as an anti-wear countermeasure. As later described, Cr-plating 8 of the inner periphery 5a is plated 0.1 mm to 0.2 mm thick.

FIGS. 3 to 8 illustrate the expander-spacer ring 4 in the composite oil-ring 3. FIG. 3 is a developed view of the expander-spacer ring 4. As seen from FIGS. 3 and 4, the expander-spacer ring 4 is constructed by bending a metallic strip 12, i.e., the strip material of the expander-spacer ring 4 having slots 11 cut from both side edges of the strip to form a laterally extending U-shaped cross section having an inwardly open channel as indicated in FIG. 4 and by folding said strip into a circle with a small gap between the abutted ends. Said slots 11 are cut so as to be staggered to each other from both side edges of the strip 12. Said slots 11 adjust spring force of the expander-spacer ring 4.

Rail engaging portions 10 are formed at each of both side edges of the strip 12 by folding the edges toward the axial direction of the expander-spacer ring 4.

The rail engaging portion 10 of the expander-spacer ring 4 contacts the inner periphery 5a of the rail ring 5, thereby transmitting the spring force of the expander-spacer ring 4 to the rail ring 5.

The rail engaging portion 10 extends into the slot 11 and therefore the rail engaging portion 10 can be long.

The composite oil-ring 3 thus constructed has the following structure. The composite oil-ring 3 has a pair of axially spaced rail rings 5 and the expander-spacer ring 4 abutted at the ends disposed between said rail rings 5 to expand the same. The expander-spacer ring 4 rings 5 is laterally extending U shaped in cross section providing rail supporting legs 4a and inwardly open channel between the legs 4a of the U. The expander-spacer ring 4 is integrally formed with a plurality of axially extending rail engaging portions 10 circumferentially spaced at the inner periphery of the legs 4a. The expander-spacer ring 4 has a plurality of slots 11 which are alternately cut from the inner periphery of the two legs 4a and extend radially.

The contact ratio of the expander-spacer ring 4 and the rail ring 5, 100 times the division of the sum of every rail engaging portion lengths by the circumferential length of the inner periphery 5a of the rail ring 5 is set at 40% or more, which is much larger than 20%–30% for the contact ratio of the conventional composite oil-ring. Such a high value of the contact ratio is possible, because the cross section of the expander-spacer ring 4 in the axial direction of the composite oil-ring 3 is formed laterally extending U-shaped and the width of the slot 11 is formed narrow. This high value of the contact ratio has an effect to decrease the contact pressure between the rail engaging portion 10 and the rail ring 5 and thereby reduce the abrasion of the composite oil-ring 3.

Figure 17:
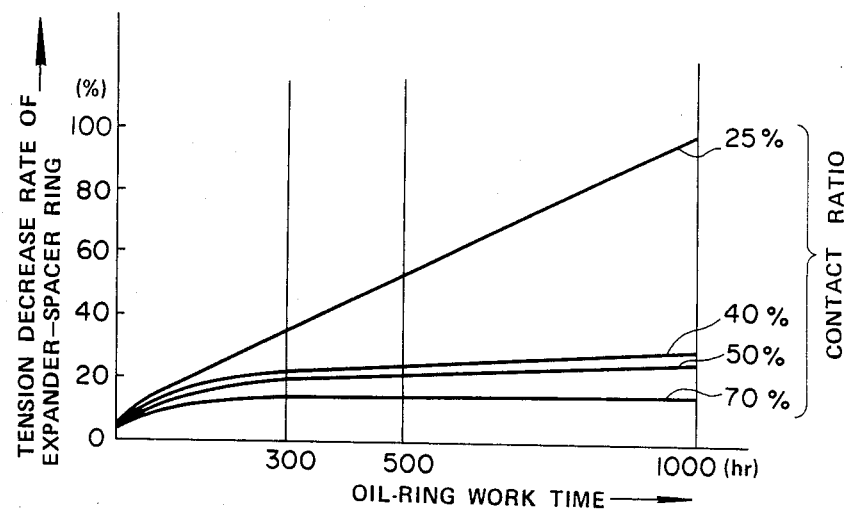
FIG. 17 is a tension decrease characteristic diagram showing the relationship among the oil-ring work time, the tension decrease rate of the expander-spacer ring and the composite oil-ring contact ratio.

The value of 40% or more is taken for the purpose of securing a tension decrease rate of about 25% in 300 hours of service, considering that, as indicated in FIG. 17, the higher the contact ratio of the expander-spacer ring 4 and the rail ring 5 is made, the lower the tension decrease rate of the expander-spacer ring 4 will become. Namely, the tension decrease nearly saturates beyond 300 hours and the change of tension stabilizes. 40% is a value guaranteeing the necessary contact length to give the ultimate necessary tension at 300 hours. A solid ring without slots 11 would be free from tension decrease, but it would deteriorate the followability to the cylinder bore 7. Therefore, from a standpoint of oil consumption saving due to the improvement of followability to the inner surface of the cylinder bore 7, a composite oil-ring with slots 11 would be preferable to the solid ring.

Figure 7:
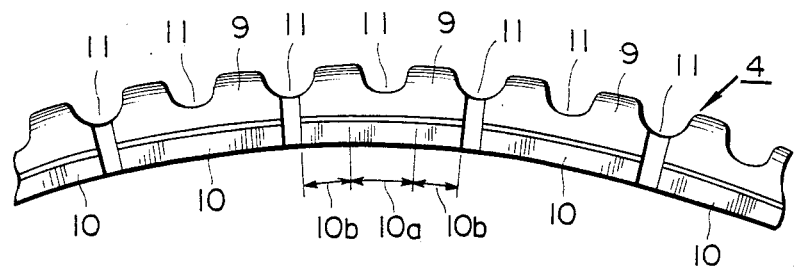
FIG. 7 is a bottom view of the expander-spacer ring in FIG. 4.
Figure 8:
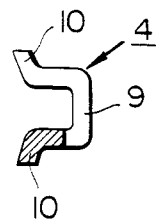
FIG. 8 is a sectional view of the expander-spacer ring in FIG. 6.

As indicated in FIG. 7, the rail engaging portion 10 consists of the circumferentially central portion 10a and the circumferentially end portions 10b situated at both ends of the circumferentially central portion 10a. The curvature of the circumferentially central portion 10a at contact with the rail ring 5 is made different from that of the circumferentially end portion 10b, while the curvature of the circumferentially central portion 10a is made equal to that of the inner periphery 5a of the rail ring 5, thereby contributing to an increase of the contact area. The curvature of the circumferentially end portions 10b in a free state before the rail engaging portion 10 comes into contact with the rail ring 5, is made smaller than that of the inner periphery 5a of the rail ring 5. Under this condition, the tip of the circumferentially end portion 10b, upon its contact with the rail ring 5, tends to bite into the rail ring 5, thereby preventing an independent movement of the rail ring 5. Prevention of the independent movement of the rail ring 5 has an effect of reducing the abrasion due to a relative rotation of the expander-spacer ring 10 and the rail ring 5 as well as preventing an increase of oil consumption due to a coincidence of the upper and lower gaps 6 of the rail rings 5.

To reduce the abrasion due to the contact of the rail engaging portion 10 with the rail ring 5, the thickness of the Cr-plating 8 plated on the inner periphery 5a of the rail ring 5 is set over 0.1 mm. This value of thickness 0.1 mm is an experimentally determined value which assures 2000 hours of service (equivalent to 300,000 Km run of a car). Such Cr-plating 8 makes the composite oil-ring of the present invention fully applicable even to a diesel engine used under severe service conditions.

Figure 9:
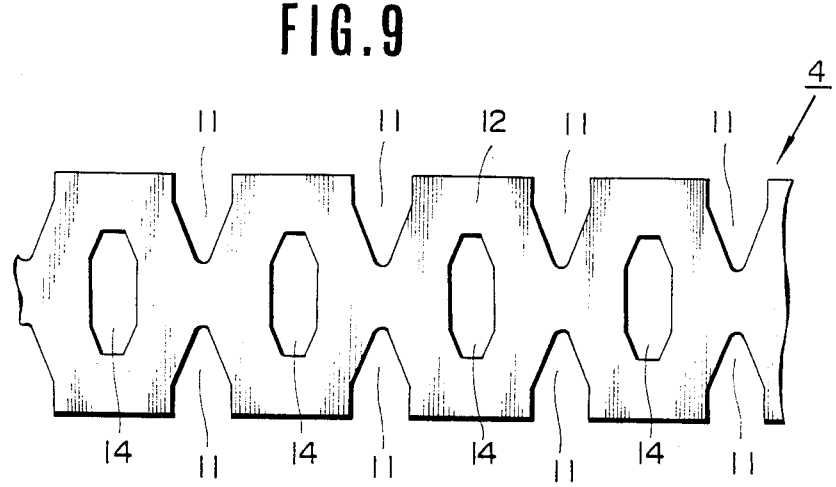
FIG. 9 is a developed view of expander-spacer ring of the composite oil-ring in a second embodiment of the present invention.
Figure 10:
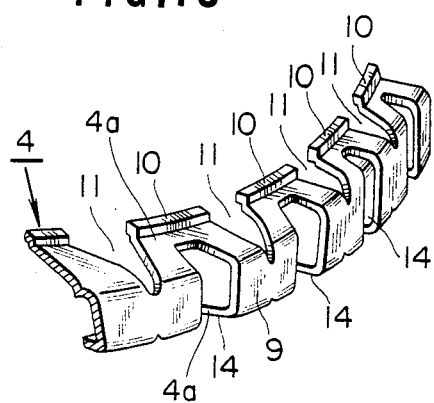
FIG. 10 is an oblique partial view of the expander-spacer ring of the composite oil-ring in a second embodiment of the present invention.
Figure 11:
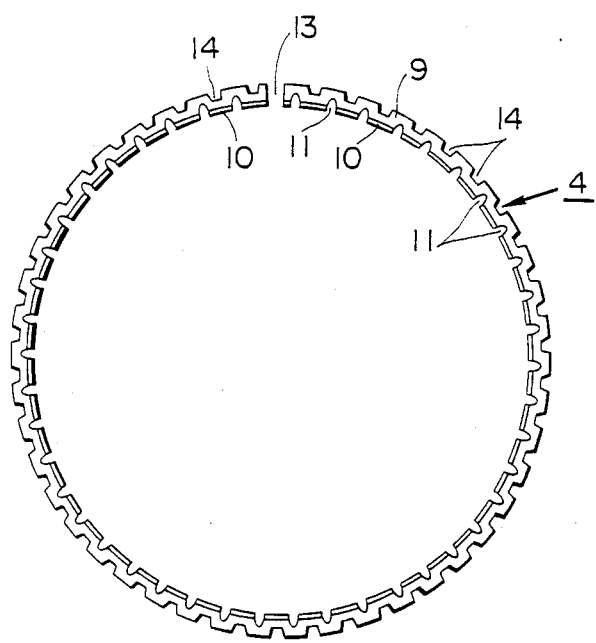
FIG. 11 is a reduced plan view of the expander-spacer ring in FIG. 10.
Figure 12:
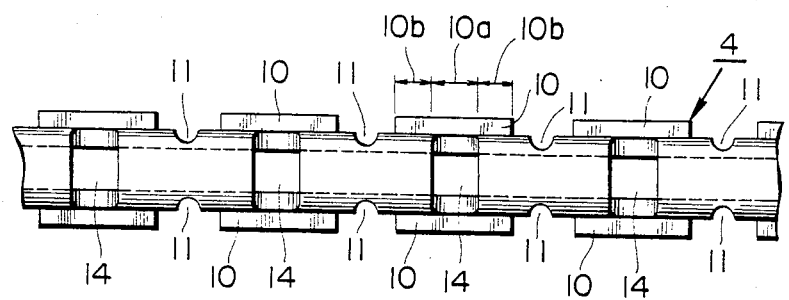
FIG. 12 is a front elevational view of the expander-spacer ring in FIG. 10.
Figure 13:
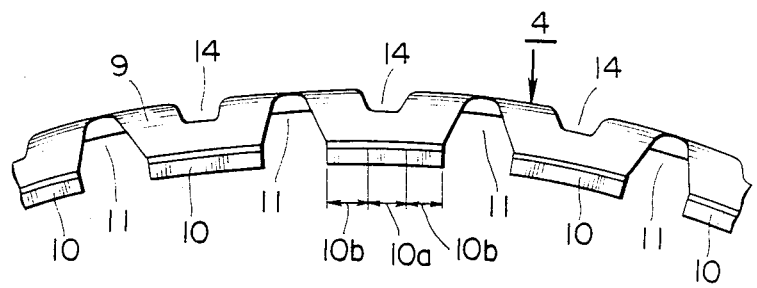
FIG. 13 is a bottom view of the expander-spacer ring in FIG. 10.
Figure 14:
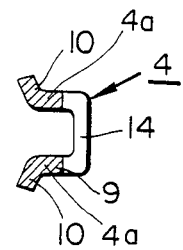
FIG. 14 is a sectional view of the expander-spacer ring in FIG. 10.

FIGS. 9 to 16 illustrate a second embodiment of the present invention. FIG. 9 is a developed view of the expander-spacer ring 4. The difference of the second embodiment from the first one lies in the spring structure of the expander-spacer ring 4. Otherwise there is no difference between the two and therefore, in the following, only the difference will be explained omitting explanation of the like parts of the device by virtue of using like reference numerals therefor.

First, referring to FIG. 9, the metalic strip 12 has a plurality of slots 11 which are coincidently cut from both side edges of the strip 12 and extend in the width direction of the strip 12. Further, the strip 12 has an opening 14 at midpart in the width direction and between the circumferentially adjacent slots 11. By virtue of varying sizes of the slot 11 and the opening 14, the spring force of the expander-spacer ring 4 can be adjusted. The strip 12 is bent so that the cross section thereof may be laterally extending U-shaped and then circumferentially folded into a circle. The rail engaging portion 10 is formed by bending the inner periphery of the strip 12 in the axial direction.

In the composite oil-ring 3 thus constructed, the expander-spacer ring 4 abutted at the ends is laterally extending U-shaped in cross section providing rail supporting legs 4a and inwardly open channel between the legs 4a. The expander-spacer ring 4 is integrally formed with a plurality of axially extending rail engaging portions 10 circumferentially spaced at each of the inner peripheries of the legs 4a. The expander-spacer ring 4 has a plurality of slots 11 which are coincidently cut from the inner peripheries of the legs 4 and extend radially.

Figure 15:
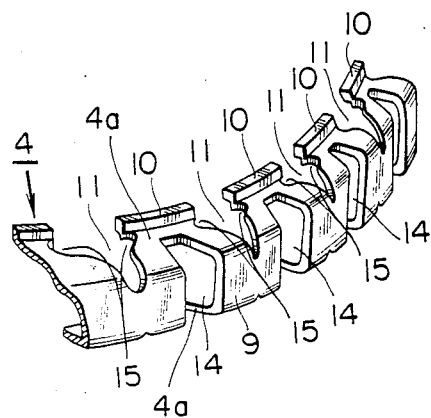
FIG. 15 is an oblique partial view of the expander-spacer ring in FIG. 10 in which both sides of the rail engaging portion transition portion are notched.
Figure 16:
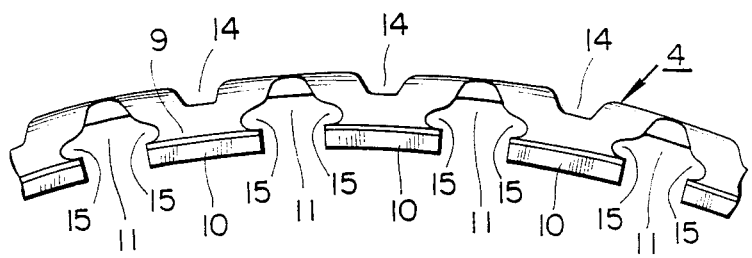
FIG. 16 is a bottom view of the expander-spacer ring in FIG. 15.

In the composite oil-ring of the second embodiment, the contact ratio of the expander-spacer ring 3 and the rail ring 5 is 40% or more. The curvature of the circumferentially central portion 10a of the rail engaging portion 10 is made equal to that of the inner periphery 5a of the rail ring 5, while the curvature of the circumferentially end portions 10b is made smaller than that of the inner periphery 5a of the rail ring 5. Through this structure, the contact ratio can be increased and at the same time an independent movement of the rail ring 5 can be prevented. As shown in FIGS. 15 and 16, for the purpose of reducing the pressure of the rail engaging portion 10 against the inner periphery 5a of the rail ring 5, the transition portion of the leg 4a of the U to the rail engaging portion 10 may be cut from both sides of the leg 4a such that the circumferential width of the transition portion is narrower than the width of the remaining portion of the leg 4a. In this construction the rail engaging portion 10 protrude into the slots 11 and in consequence the rail engaging portion 10 can be maintained long.

As apparent from the above description of the preferred embodiments the following effects can be obtained. First, by virtue of the cross section of the expander-spacer ring 4 being made laterally extending U-shaped, the rail engaging portion 10 can be made long as well as making the contact ratio 40% or more. Thus with said increased contact ratio, the contact pressure between the expander-spacer ring 4 and the rail ring 5 can be reduced, thereby substantially reducing the abrasion of the composite oil-ring 3.

Further, since the curvature of the circumferentially end portions 10b of the rail engaging portion 10 is set smaller than that of the inner periphery of the rail ring 5, the tip of the rail engaging portion can bite into the rail ring 5, thereby preventing an independent movement of the rail ring 5 and contributing to the prevention of abrasion and suppression of the increase of oil consumption.

What is claimed is:

1. A composite oil-ring for disposition in an oil ring groove of a piston reciprocally positioned in a cylinder comprising:
    a pair of axially spaced rail rings;
    an expander-spacer ring disposed between said rail rings to expand said rail rings, said expander-spacer ring being laterally extending U shaped in cross section providing rail supporting legs and an inwardly open channel between the legs of the U, integrally formed with a plurality of axially extending rail engaging portions circumferentially spaced at the inner periphery of each of said legs, and having a plurality of slots extending radially cut from the inner peripheries of said legs, said rail engaging portions having circumferential central portions with a curvature substantially the same as and in the same direction as the curvature of the inner periphery of said rail rings and circumferential end portions with a curvature, in a free state before contacting said rail rings, in the same direction as and smaller than the curvature of the inner periphery of said rail rings.

2. A composite oil-ring of claim 1 wherein the sum of the circumferential lengths of every rail engaging portion is set at 40% or more of the circumferential length of the inner periphery of said rail ring.

3. A composite oil-ring of claim 1 wherein said slots are alternately cut from the inner peripheries of the two legs of the U.

4. A composite oil-ring of claim 1 wherein said rail engaging portion and the inner portion of the leg of the U protrude into said slot in the circumferential direction of said expander-spacer ring.

5. A composite oil-ring of claim 1 wherein said slots are coincidently cut from the inner peripheries of both legs of the U and openings are provided at the midwidth of said expander-spacer ring and between circumferentially adjacent slots.

6. A composite oil-ring of claim 1 wherein the transition portion of the leg of the U to said rail engaging portion is cut from both sides of said leg of the U such that the circumferential width of said transition portion is narrower than the width of the remaining portion of said leg of the U.

7. A composite oil-ring of claim 1 wherein the sum of the circumferential lengths of every rail engaging portion is set at 40% or more of the circumferential length of the inner periphery of said rail ring and the inner and outer peripheries of said rail ring are Cr-plated, said plating of the inner periphery of said rail ring being over 0.1 mm thick.

* * * * *